Jan. 23, 1945.  R. F. CRAWFORD ET AL  2,367,755
COMBINED HARVESTER AND THRESHER
Filed Feb. 16, 1942  4 Sheets-Sheet 4
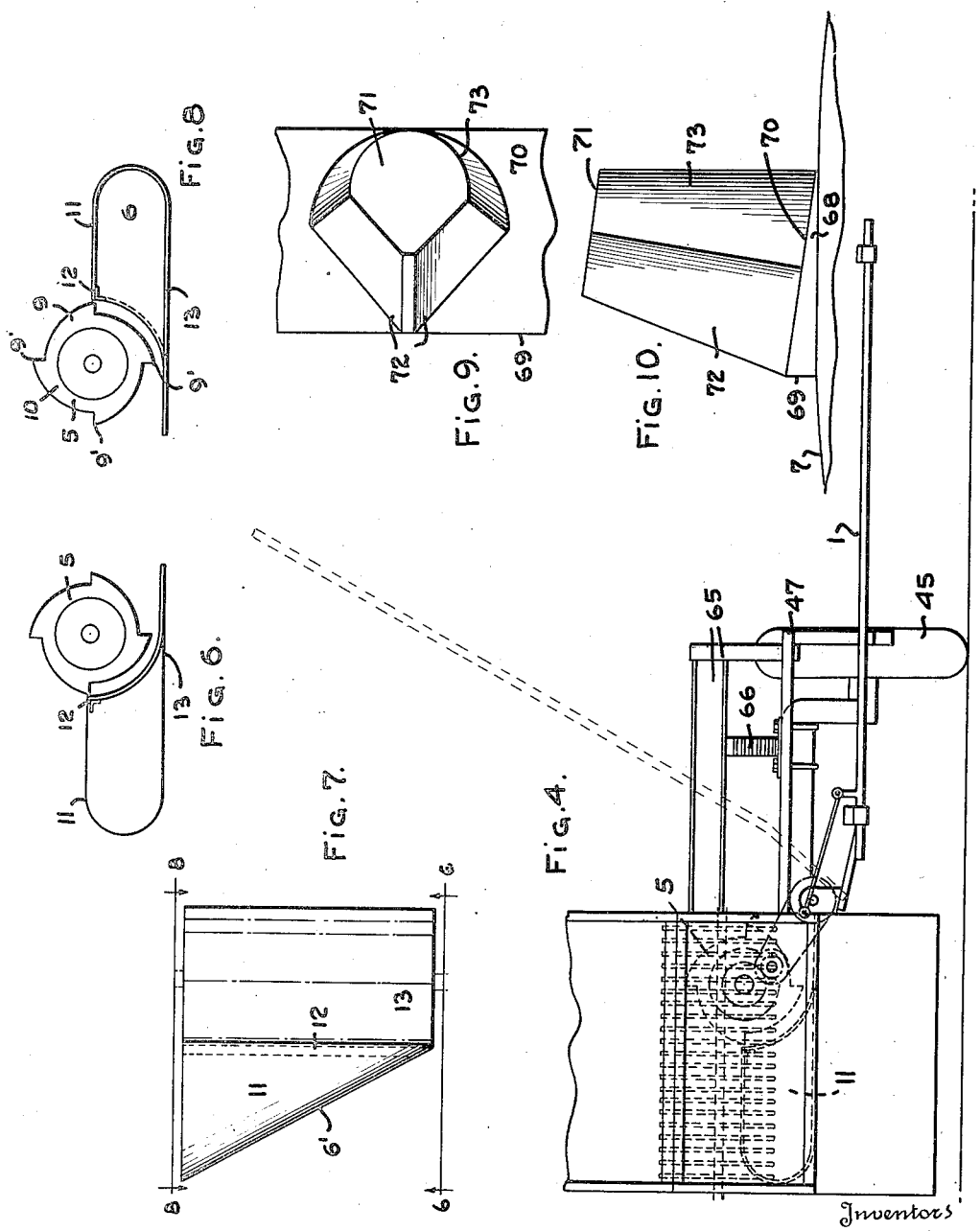

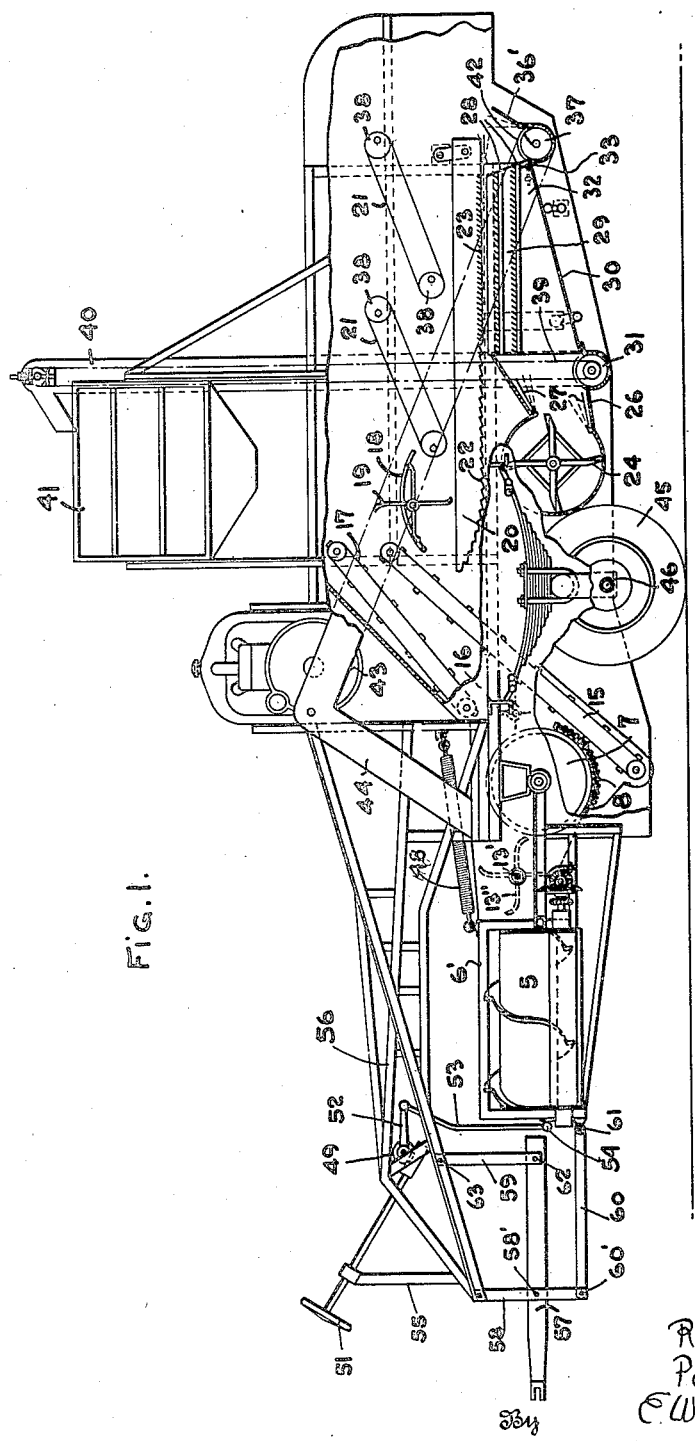

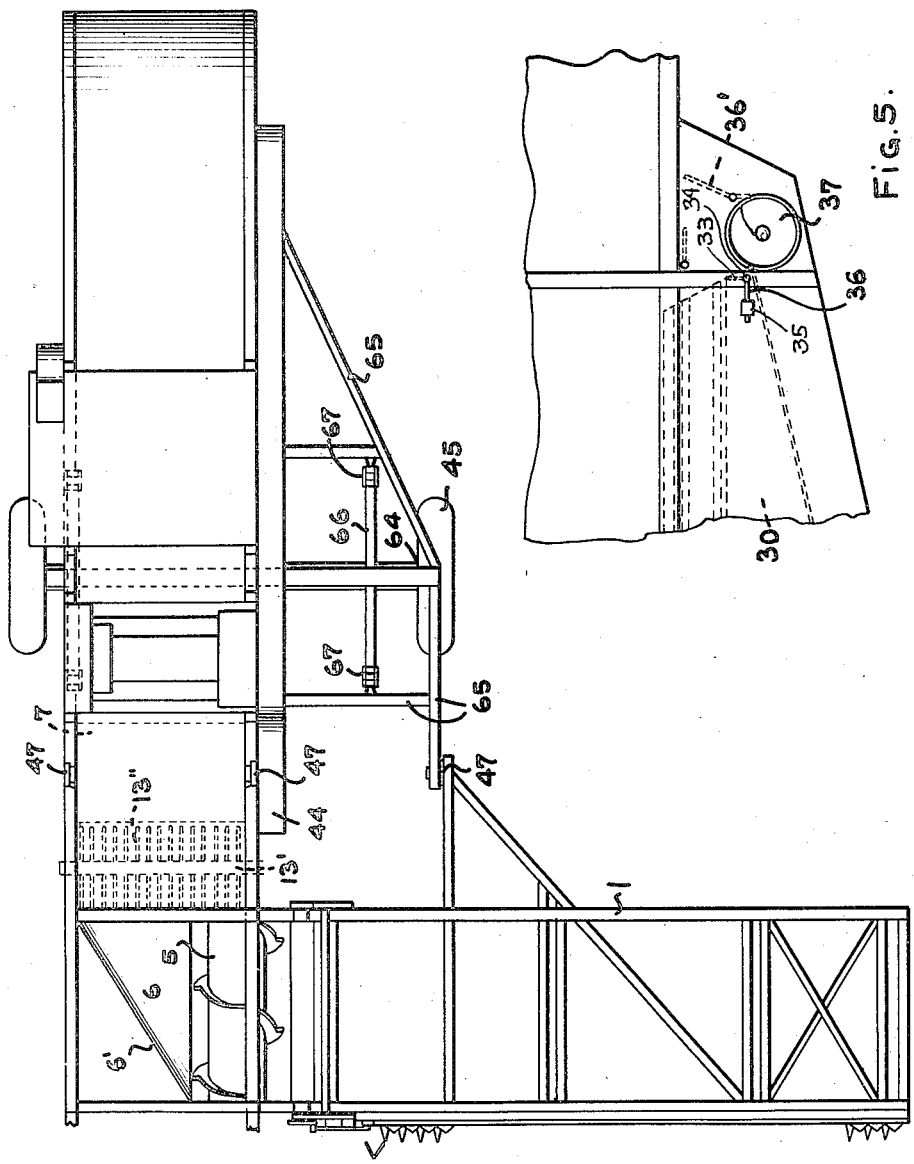

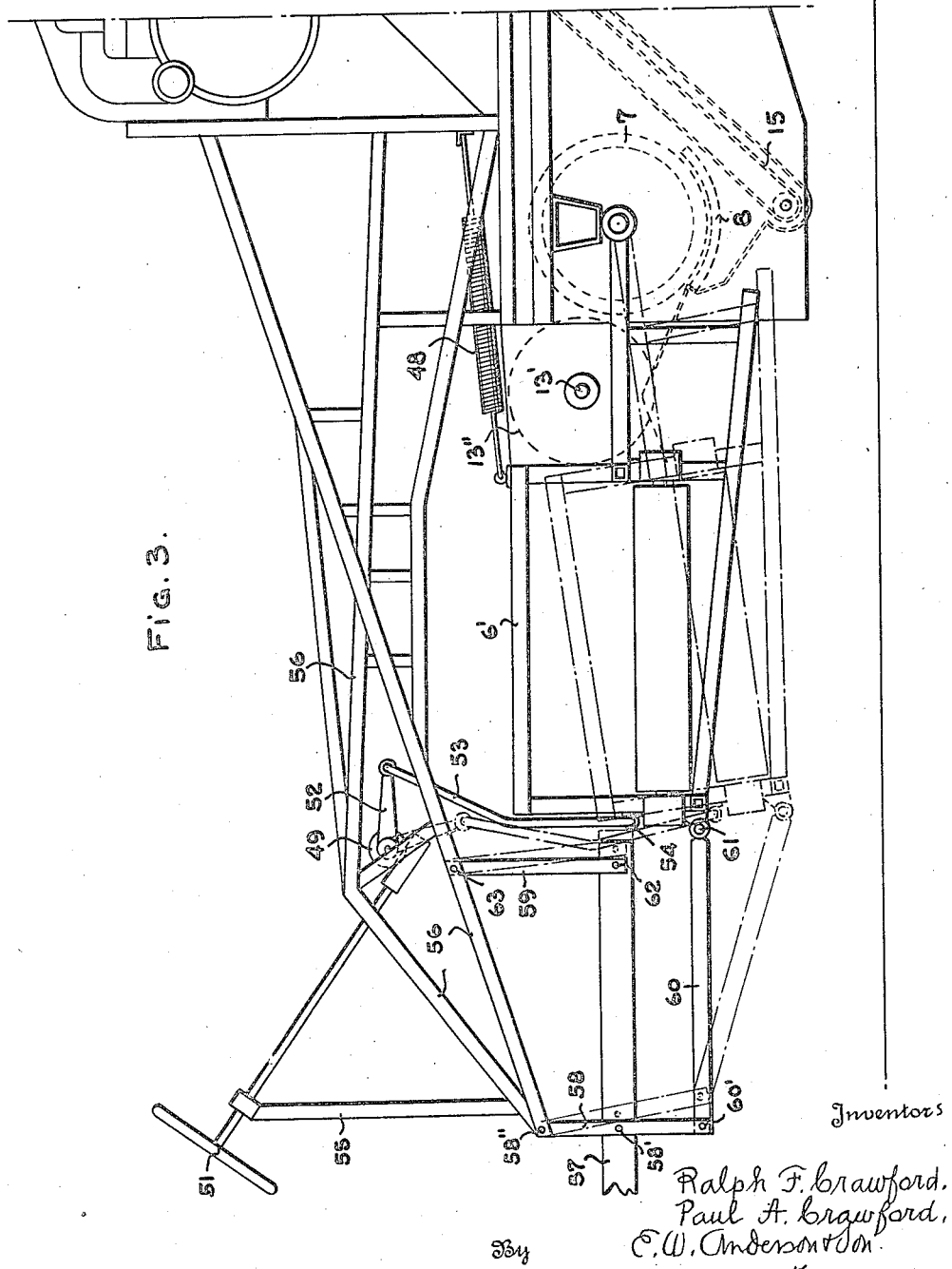

Patented Jan. 23, 1945

2,367,755

UNITED STATES PATENT OFFICE 2,367,755

COMBINED HARVESTER AND THRESHER

Ralph F. Crawford and Paul A. Crawford, Salina, Kans.

Application February 16, 1942, Serial No. 431,162

3 Claims. (Cl. 56—20)

The invention relates to combined harvesters and threshers or "combines," having for an object to provide an improved small combine of comparatively simple and inexpensive nature which is adapted to be constructed largely from certain standard automobile or truck parts. Another object is to provide the combine including the platform, cutting mechanism and reel with supporting wheels upon a single axle and improved means of spring support thereof adapted to eliminate sidesway upon the platform side. Another object is to provide improved means for adjusting the height of the platform, its cutting mechanism and reel in accord with the height of crops to be harvested. Another object is the provision of improved means for delivering the harvested crops from the platform to the cylinder and concave. Other objects and advantages will appear hereinafter.

The invention consists in the novel construction and combinations of parts as hereinafter set forth in the claims.

In the accompanying drawings,

Figure 1 is a side view of the combine from the platform side with parts broken away.

Figure 2 is a plan view of the combine with parts removed and parts in dotted lines.

Figure 3 is a detail side view of the forward portion of the combine showing in dotted lines the adjustment of the forward unit of the machine.

Figure 4 is a detail front view of the combine with parts removed, parts in dotted lines and parts broken away.

Figure 5 is a detail side view showing the choking device for the grain cleaner air chute.

Figure 6 is a detail front view as indicated by by the line 6—6, Figure 7, of the feed auger and the reverse funnel form or flaring feed chamber.

Figure 7 is a detail plan view of the reverse funnel form feed chamber.

Figure 8 is a detail rear view as indicated by the line 8—8, Figure 7, of the reverse funnel form feed chamber, and the feed auger.

Figure 9 is a detail plan view of one of the cylinder ribs and a cylinder tooth mounted thereon.

Figure 10 is a detail side view of the same showing the cylinder, mostly broken away.

In these drawings, the numeral 1 designates the platform, carrying the usual cutting mechanism and reel 2 and 3, said platform having an endless canvas belt 4, delivering to a feed auger 5, disposed longitudinally with respect to the combine and forming the inner side of a feed chamber 6 flaring towards the cylinder and concave, said auger being rotated in a direction to provide an undershot feed. The feed auger 5 is of a diameter considerably less than the length of the cylinder and concave 7 and 8, to leave the major portion of the cylinder and concave extending beyond said auger. As the feed chamber 6 is flaring towards the cylinder and concave and the feed auger forms the inner side of said chamber, the feed chamber lies beyond the flange of said auger to a gradually increasing extent from front to rear. Thus the push of the flange of the feed auger upon the crops delivered thereto is both longitudinal and lateral with respect to the flaring feed chamber and the delivery of said crops will be evenly spread throughout the length of the cylinder and concave.

In order to facilitate the feed of said crops by the auger 5, the flange 9 of the auger is provided with successive portions 10, each of which is of gradually increasing breadth, these successive portions 10 being joined by abrupt shoulders 9', whereby the push of the auger flange is converted into gradually built up or increasing pulsations. And as the stems or straw of the harvested grain tend in some cases to rise too high in said feed chamber 6, the latter is provided with a horizontal top side 11 approximately level with the auger shaft or longitudinal axis to hold down the straw, said top side terminating adjacent said auger in a straight longitudinal cut-off bar 12. The horizontal lower side or bottom 13 of the feed chamber 6 extends beneath the feed auger as shown in Figure 8 and is of course smooth. In those cases where there are more or less weeds harvested with the grain, the specific gravity of the two being different, there is tendency for the feed auger to throw the weeds more or less to the outer side of the feed chamber and thus separate the weeds from the harvested grain throughout progress thereof through the machine.

A rotary feeder 13' is interposed between the cylinder and concave and the rear end of the flaring feed chamber, the radial fingers 13'' of said feeder having the inner ends thereof straight and the outer ends thereof curved or bent away from the direction of rotation of said feeder. This feeder is designed to provide an equalized or even feed regardless of light or heavy straw, to eliminate wrapping of straw and to provide for complete release of the straw.

The grain is discharged from the concaves 8, upon an inclined endless belt elevator 15, the straw being carried upwardly between a beater 16 and said elevator, and pressed down by an upper endless belt 17 shorter than and spaced from the said elevator and overlying the upper portion of the latter, the straw and grain being delivered to stationary spaced fingers 18, between which work the radial arms of a rotary picker 19, to thereby comb, loosen and spread the straw, said rotary picker being constructed similarly to the aforesaid rotary feeder and being adapted to be driven at a speed to throw the straw upwardly and rearwardly and to agitate the straw so that the grain and chaff will fall through the spaced fingers 18 upon the rear end of a vibratory grain pan 20 and the straw will be delivered to the forwardmost of the vibratory or oscillatory straw racks 21.

The grain pan is provided with a forward solid stepped bottom 22 adapted to throw the grain rearwardly and a rear screen 23 through which the grain will pass.

Below the solid stepped bottom of the grain pan are located the fan 24, the fan drum 25 and the air chute 26 of said drum, said air chute being provided with upper and lower air deflectors 27, adjustable to alter the direction of and to concentrate or spread the blast.

Below the rear screen portion of the grain pan are located the upper and lower spaced screens 28 of a vibratory shoe 29 of the grain cleaner, grain passing through said screens being discharged upon an inclined grain board 30, delivering at its lower end to a transverse feed auger 31, said grain board and the lower of the screens 28 forming an extension of the air chute from the fan casing or drum, which extension terminates rearwardly in a contracted throat 32.

Located within said contracted throat is an upright choking device or plate 33, pivoted at its lower end at 34 and provided with a counterbalancing weight 35 adjustable upon rod 36 to automatically vary the tilt of said choking device or plate with a given force of blast from said fan to vary the relative distribution of the blast through the perforations of the lower screen 28 and outwardly through said throat in accord with varying physical characteristics or moisture content of the grain.

The tailings are discharged through said throat against an adjustable inclined tail board 36', which delivers the tailings to a transverse feed auger 37.

The straw racks 21 of which there are the usual series, comprise sprocket chains, the sprocket gears 38 of which are eccentrically mounted upon their shafts so that a vibratory up and down or oscillatory movement is given the straw to shake out the grain, said straw being carried rearwardly by said racks. The sprocket chains of the straw racks are provided with spaced transverse slats, the straw being delivered from the rearmost straw racks and discharged rearwardly of the machine.

The grain delivered to the transverse auger 31 is discharged upon the lower end of an upright endless belt elevator 39, working within a housing 40, said elevator discharging into an elevated grain bin 41. The tailings delivered to the transverse auger 37 are discharged upon an endless belt elevator 42, working within a housing 43, said elevator and housing being inclined upwardly and forwardly to a point sufficiently above the cylinder and concave to admit for a forward and downward extension 44 of said housing to deliver said tailings to the cylinder and concave for passage again therethrough.

The combine is designed to be supported upon two wheels 45 located upon the spindles of a single axle 46, so located that the combine body will be well balanced thereon.

In order to adjust the height of the platform, cutting mechanism and reel in accord with different heights of grain or crops to be harvested, the combine is formed in two units the rear of which carries the cylinder and concave and all parts rearwardly thereof as well as said axle and supporting wheels, and the forward of which carries all parts forwardly of the cylinder and concave including the platform, cutting mechanism and reel, the feed chamber housing 6', the longitudinal feed auger 5 and the rotary feeder 13', said forward unit having pivotal connection at 47 with the rear unit centrally with respect to the axis of the cylinder shaft.

In order to facilitate the pivotal adjustment of the forward unit, counterbalance springs 48 connect the forward and rear units.

Means for accomplishing the pivotal adjustment of the forward unit and for holding the adjustment comprise worm gearing 49, one member of which has operating rod 50, provided with a hand wheel 51, and the other member of which has crank arm 52 to which is pivotally connected depending rod 53, the latter having at its lower end pivotal connection at 54 with the forward end of the forward unit, said operating rod and said worm gearing being mounted at 55 upon a forward extension 56 of the forward unit bridging the space between the cylinder and concave and a draw bar 57, said draw bar being adapted to have the usual connection to a tractor (not shown) and having traction connection with the forward and rear combine units.

The draw bar has traction connection with the forward and rear units through forward and rear pairs of upright links 58 and 59, the forward links being pivoted centrally of the lengths thereof to the draw bar at 58' and having at their upper ends pivotal connection at 58'' with said bridging extension 56 and at their lower ends pivotal connection at 60' with the forward ends of a pair of rearwardly extending longitudinal links 60, the rear ends of the latter having pivotal connection at 61 with the forward unit. The rear links 59 have at the lower ends thereof pivotal connection to the draw bar at 62 and at their upper ends pivotal connection to said bridging extension at 63. It is designed that the draw bar having the above connections shall have the pull thereof equalized with respect to the forward and rear combine units, with no side draft.

In order to provide means of spring support for the combine body, its platform, cutting mechanism and reel adapted to eliminate sidesway on the platform side, the aforesaid axle 46 has extension at 64 beyond the combine body at the platform side more than on the other side, the combine body is provided with an outrigger frame 65 overlying said axle extension at the platform side, and transverse bowed leaf springs 66 have clip connection with said axle, one of said springs having the terminal portions thereof provided with pivoted shackle connection 67 with the combine body directly and the other of said springs being located beyond the combine body at the platform side near the end of the axle extension at this side and having the terminal portions thereof provided with pivoted shackle connection with said outrigger frame.

The cylinder 7 is of drum form and is provided with a circumferential series of parallel spaced longitudinal ribs 68, having each a forward radial shoulder 69 and an oblique outer surface 70 extending from said shoulder inwardly towards and merging into the cylindrical surface of said drum. Each of said ribs is provided with a longitudinal series of radial spaced teeth 71, and each of said teeth is provided with a forward side composed of two oppositely inclined forwardly intersecting plane surfaces 72, and a rounded rear side 73. The spaces between the ribs 68 of the cylinder are designed to receive and protect the grain from being crushed in the threshing operation. The forward shoulders of said ribs are designed to create down draft in the threshing operation to thereby increase capacity. The specially designed teeth 71 are adapted to exert traction on the straw, to increase threshing efficiency and to accomplish better cleaning of the concaves.

The concaves 8 are of edge bar type and are provided with suitable means for adjusting the same with respect to the cylinder 7.

We claim:

1. In a combined harvester and threasher, a rear unit having supporting wheels and a cylinder and concave, a forward unit having a platform, cutting mechanism and a reel and feeding means to which said platform delivers and delivering to said cylinder and concave, said forward unit having pivotal connection with said rear unit centrally with respect to the shaft of said cylinder, and means for pivotally adjusting the forward unit and holding the adjustment to vary the height of said platform, cutting mechanism and reel in accord with different heights of grain to be harvested comprising a draw bar, a forward extension of said rear unit bridging the space between said cylinder and draw bar and having supporting and traction connection with said draw bar, and manipulable means embodying worm gearing mounted upon said bridging extension and having operating connection with the forward end of said forward unit.

2. In a combined harvester and thresher, a rear unit having supporting wheels and a cylinder and concave, a forward unit having a platform, cutting mechanism and a reel and feeding means to which said platform delivers and delivering to said cylinder and concave, said forward unit having pivotal connection with said rear unit centrally with respect to the shaft of said cylinder, and means for pivotally adjusting the forward unit and holding the adjustment to vary the height of said platform, cutting mechanism and reel in accord with different heights of grain to be harvested comprising a draw bar having a pair of upright links and a pair of longitudinal links pivoted forwardly to the lower ends of said upright links and rearwardly having pivotal and traction connection with said forward unit, said rear unit having a forward extension bridging the space between said cylinder and draw bar and having supporting and traction connection with the upper ends of said upright links, and manipulable means embodying worm gearing mounted upon said bridging extension and having operating connection with the forward end of said forward unit.

3. In a combined harvester and thresher, a rear unit having supporting wheels and a cylinder and concave, a forward unit having a platform, cutting mechanism and a reel and feeding means to which said platform delivers and delivering to said cylinder and concave, said forward unit having pivotal connection with said rear unit centrally with respect to the shaft of said cylinder, and means for pivotally adjusting the forward unit and holding the adjustment to vary the height of the platform, cutting mechanism and reel in accord with different heights of grain to be harvested comprising a draw bar having forward and rear pairs of upright links and a pair of longitudinal links pivoted forwardly to the lower ends of the forward pair of upright links and rearwardly having pivotal traction connection with said forward unit, said rear unit having a forward extension bridging the space between said cylinder and draw bar and having supporting and traction connection with the upper ends of said forward and rear pairs of links, and manipulable means embodying worm gearing mounted upon said bridging extension and having operating connection with the forward end of said forward unit.

RALPH F. CRAWFORD.
PAUL A. CRAWFORD.